INVENTORS
WALTER R. WISE, JR.
MORTON P. NASHMAN
LLOYD P. WALKER, JR.
ROGER T. BERGQUIST
BY

David W. Tillott
ATTORNEY

June 11, 1968   W. R. WISE, JR., ET AL   3,387,669
IMPACT WRENCH TORQUE-MEASURING DEVICE
Filed Jan. 20, 1966   3 Sheets-Sheet 2

INVENTORS
WALTER R. WISE, JR.
MORTON P. NASHMAN
LLOYD P. WALKER, JR.
ROGER T. BERGQUIST
BY
David W. Tillott
ATTORNEY June 11, 1968   W. R. WISE, JR., ET AL   3,387,669
IMPACT WRENCH TORQUE-MEASURING DEVICE
Filed Jan. 20, 1966   3 Sheets-Sheet 3

INVENTORS
WALTER R. WISE, JR.
MORTON P. NASHMAN
LLOYD P. WALKER, JR.
ROGER T. BERGQUIST

BY David W. Tillott
ATTORNEY

United States Patent Office 3,387,669
Patented June 11, 1968

1

3,387,669
IMPACT WRENCH TORQUE-MEASURING DEVICE
Walter R. Wise, Jr., Millington, Morton P. Nashman, Somerset, Lloyd P. Walker, Jr., Belle Mead, and Roger T. Bergquist, Califon, N.J., assignors to Ingersoll-Rand Company, New York, N.Y., a corporation of New Jersey
Filed Jan. 20, 1966, Ser. No. 521,969
16 Claims. (Cl. 173—12)

ABSTRACT OF THE DISCLOSURE

An impact tool including a rigid anvil carrying a rotatively mounted ring and a spring restricting the ring from moving in the normal direction of rotation relative to the anvil in order to measure deceleration forces acting on the anvil. The ring is mounted on the anvil by a cam means which causes it to move axially as it rotates relative to the anvil and the tool is provided with a mechanism to sense the axial movement of the anvil and, in response thereto, to shut off the tool or to create a signal for the operator.

This invention relates generally to rotary impact tools and more particularly to means for measuring or sensing torque loads applied to a fastener by a rotary impact tool. In general, this invention is an improvement on the torque limiting means described in the Patent No. 2,889,902 issued to Henry C. Harrison et al. on June 9, 1959.

Heretofore many attempts have been made to provide a torque sensing means for a rotary impact tool utilizing the deceleration forces created by the impact tool to operate the torque sensing or measuring mechanism. Most of these devices have been relatively impractical because they did not provide a sufficiently accurate measurement of torque. For example, the above noted Harrison et al. patent did not provide a sufficiently accurate measurement of torque to be a practical mechanism. Other devices have placed a torque measuring means on the motor rotor of the impact tool, an example being shown in the Elliott et al. Patent No. 3,018,866. Here again, this is not a very practical mechanism because it does not provide a sufficiently accurate determination of torque.

The principal object of this invention is to provide an impact tool fastener torque measuring means which has a sufficiently high degree of accuracy and reliability to be a practical device and which utilizes the deceleration forces created by the torque load on the fastener to operate the torque measuring means.

Other important objects of this invention are: to provide a novel impact tool torque measuring means using decelebration forces and providing a high degree of accuracy in the measurement of torque loading on a fastener to provide an impact tool torque measuring device which is relatively small and compact and can be used with a conventional impact tool; to provide a fastener torque measuring means for use on an impact tool and having a nonlinear torque sensing device which amplifies the torque measuring movement of the torque measuring means in the region of the torque cut-off point of the tool; and to provide a fastener torque measuring means of simple construction which can be manufactured relatively inexpensively.

Figures 1, 4:
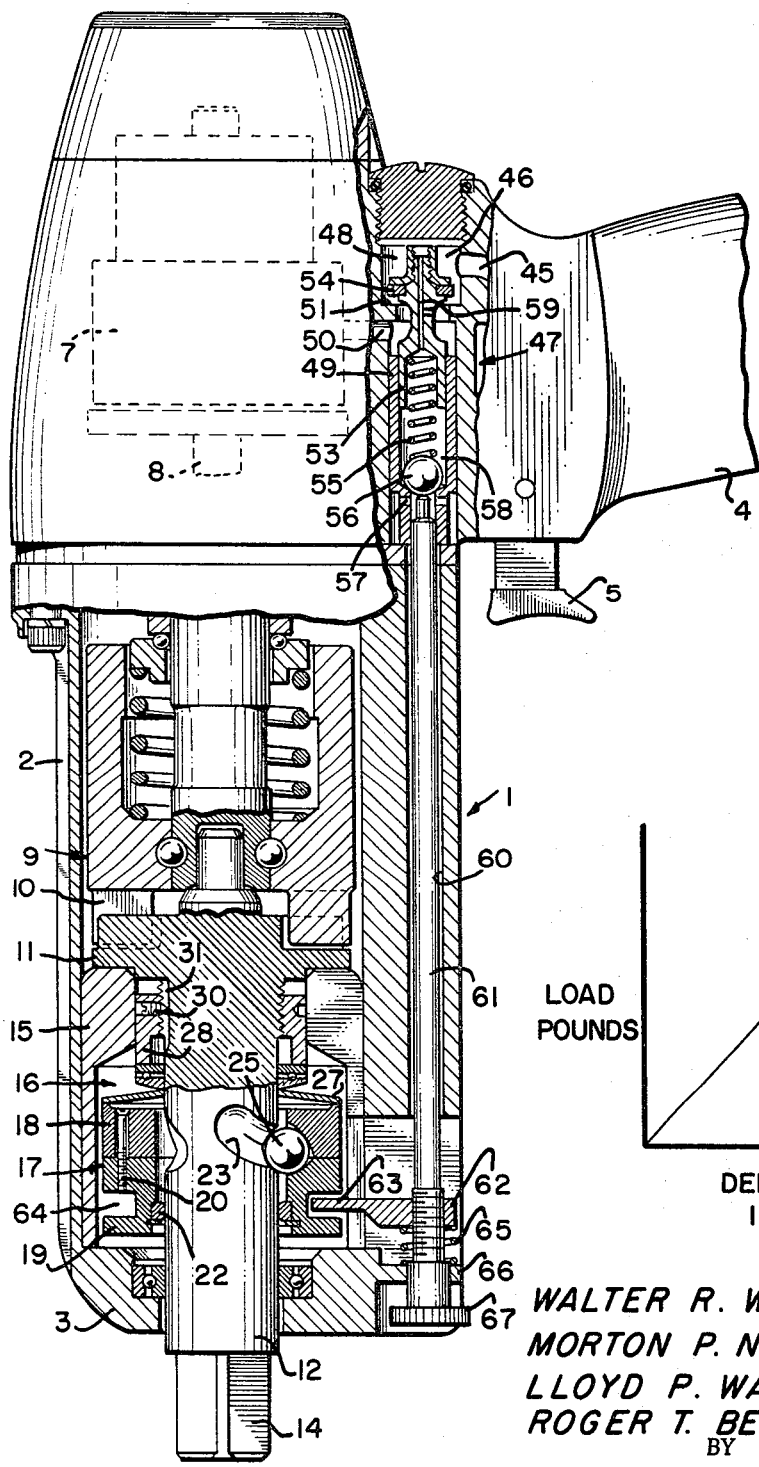
Figure 2:
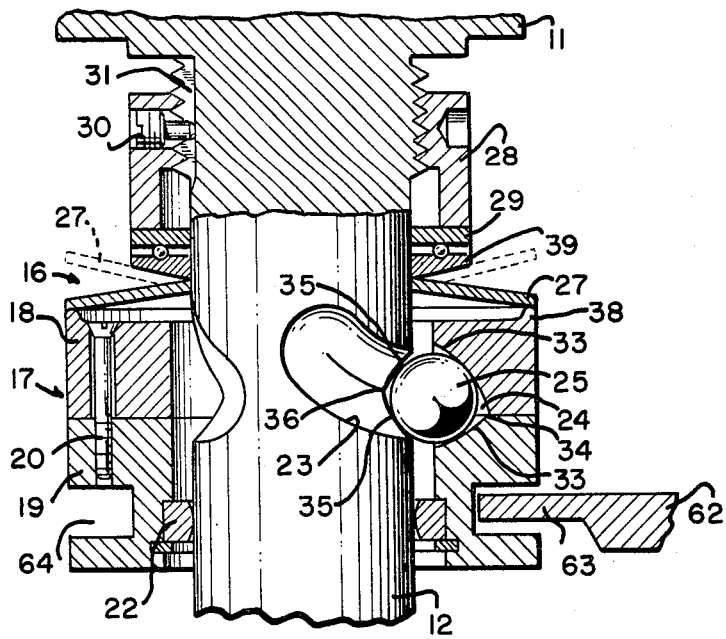

The invention is described in connection with the accompanying drawings wherein:
FIG. 1 is an elevational view with portions cut away of an impact tool employing a torque measuring and limiting means constructed in accordance with the present invention;
FIG. 2 is an enlarged fragmentary sectional view of the torque measuring means shown in FIG. 1;

2

Figure 3:
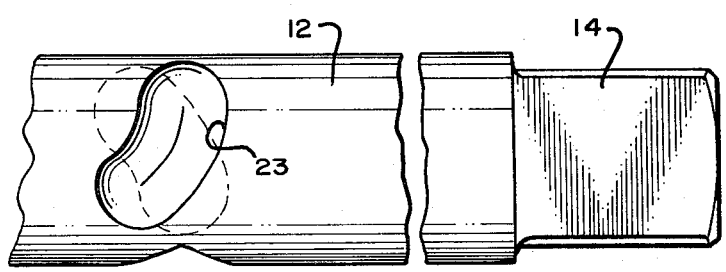
Figure 6:
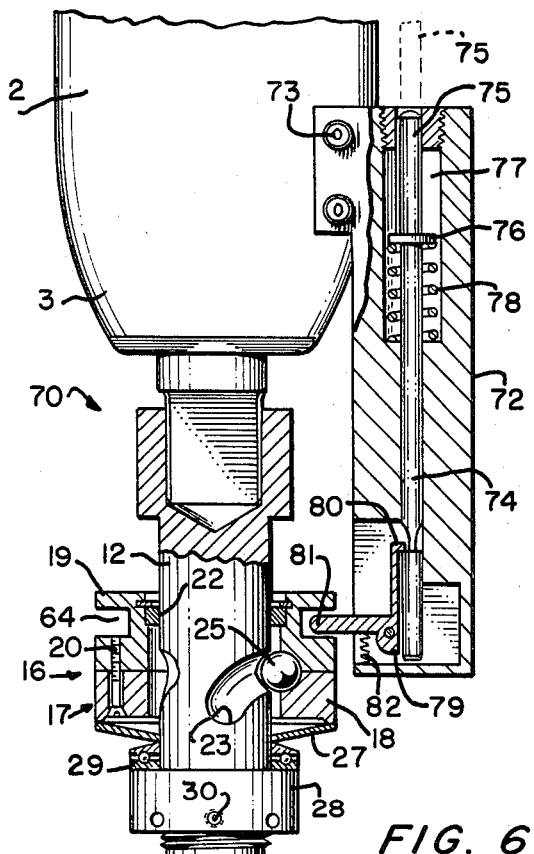
Figure 5:
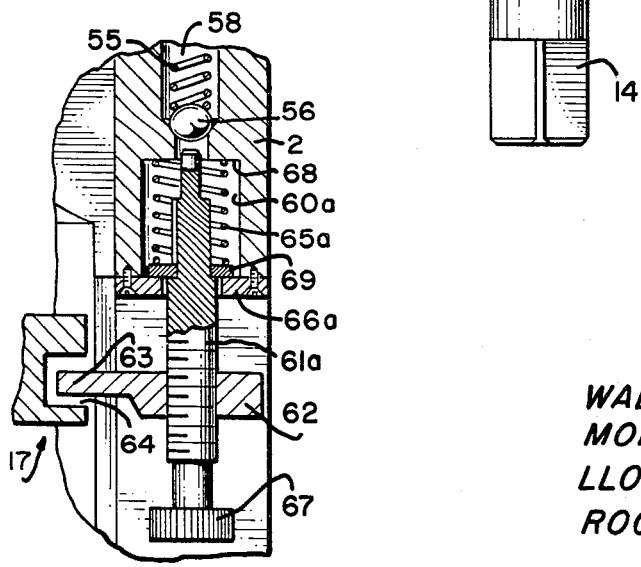

FIG. 3 is a fragmentary elevational view of the front portion of the anvil shown in the embodiment of FIG. 1;
FIG. 4 is a curve illustrating a deflection characteristic of the spring utilized in the torque measuring means as a function of the load acting on the spring;
FIG. 5 is a fragmentary diagrammatic view of a second embodiment of the tool of FIG. 1; and
FIG. 6 is a fragmentary elevational view with portions cut away of a third embodiment of the invention.

The first embodiment of the impact tool or wrench 1 shown in FIGS. 1 to 3 includes a casing 2 having a front nose 3 and a pistol-shaped handle portion 4. The handle 4 carries a trigger 5 operative to feed fluid pressure to the motor 7 having a motor shaft 8, both of which are shown in dotted lines. The motor shaft 8 is connected to a conventional impact mechanism 9 including a hammer 10 and an anvil 11.

The impact mechanism 9 delivers periodic rotary impacts to the spindle 12 in a manner which is well known in the impact tool or wrench art. The wrench spindle 12 carries a plurality of flats 14 on its outer end which is adapted to fit in a conventional wrench socket (not shown). All of the foregoing structure is conventional and, for that reason, is not described in detail.

The spindle 12 carries a torque measuring device 16 which operates to provide an indication of the torque load applied to a fastener by the spindle 12 during the operation of the wrench 1. The torque measuring device 16 includes a torque measuring ring 17 composed of two sections or portions 18 and 19 separated along a radial plane and attached together by several bolts 20 extending through the two sections 18 and 19 in a direction generally parallel to the axis of the spindle 12. It is also apparent that the ring 17 can be made in one piece. The ring section 19, which is the lower ring section shown in FIG. 1, contains an internal bearing 22 surrounding and rotatably engaging the spindle 12. The bearing 22 is located near the outer end of the ring section 19 and is sized to fit the spindle 12 snugly so that the torque measuring ring 17 is prevented from tilting or moving radially on the spindle 12 during its operation. In some applications, it is believed that the bearing 22 is unnecessary and, thus, can be omitted.

The spindle 12 contains three helically extending ball grooves 23 cut or formed in it and spaced around its circumference. By using the term helical, we mean that the grooves 23 extend around the spindle 12 in both the circumferential and the axial directions. In addition, the ring 17 contains three internal ball sockets 24 which contain corresponding balls 25 cooperatively engaged and seated in the grooves 23 formed on the spindle 12, as shown in FIG. 2. The helical grooves 23 cooperate with the balls 25 to force the ring 17 to travel axially on the spindle 12 as the ring rotates relative to the spindle 12. In FIG. 1, the grooves 23 are arranged so that the ring 17 moves axially upward as it rotates around the spindle 12 in a clockwise direction, shown looking downward along the axis of the spindle 12. The length of each groove 23 is limited to extending around the spindle circumference through an angle of about 90°. As a result, the ends of the grooves 23 serve to stop the relative movement of the ring 17 on the spindle 12 in each axial direction. Thus, the amount of axial and rotational movement of the ring 17 on the spindle 12 is limited. It should be understood that the angle of rotation of the ring 17 can be reduced considerably. For example, this angle can be as small as, say, 10°.

The torque measuring ring 17 is urged downwardly, as shown in FIGS. 1 and 2, by a disc-type, cone disc-type or Belleville spring 27 surrounding the upper portion of the spindle 12 and engaging the upper end face of the ring section 18. The Belleville spring 27 is held in place by a nut 28 threaded on the upper end of the spindle 12 and a thrust bearing 29 interposed between the nut 28 and the spring 27. The thrust bearing 29 allows the Belleville spring 27 to rotate relative to the nut 28 without being restrained by frictional forces. The nut 28 can be locked in an adjusted position by means such as the set screw 30 threaded through the nut 28 and extending into a slot 31. Although the set screw 30 is illustrated as a means for restraining the nut 28 against turning on the spindle 12 during operation, it should be obvious that many types of means could be used for locking the nut 28 in position. It should now be obvious that the nut 28 is turned on the spindle 12 to apply and vary the load applied to the Belleville spring 27. Other types of springs can be used in place of the Belleville spring 27, for example, a wave type of disc spring or a finger type of spring. In addition, a plurality of Belleville springs can be stacked together.

In general, as the spindle 12 transmits rotary impacts to a fastener through a conventional wrench socket, it periodically accelerates and then decelerates to an abrupt halt, particularly as the torque load on the fastener increases due to the fastener being tightened. After each impact and during deceleration of the spindle 12, the mass of the torque measuring ring 17 creates a force which attempts to rotate the ring 17 on the spindle 12 relative thereto in the same rotary direction as the impact applied to the spindle 12. As the periodic forces on the torque measuring ring become progressively greater, due to a greater rate of deceleration of the spindle 12 each impact, the ring 17 is forced to rotate through progressively larger rotary displacements and to move axially upward, as shown in FIG. 2, against the force applied by the Belleville spring 27. The amount of upward movement of the ring 17 is determined by the original load previously applied to the Belleville spring 27 by the nut 28. The axial movement of the ring 17 on the spindle 12 is used as an indication of the torque load on the spindle 12 during each impact. As will be obvious, various means can be used for transmitting the axial motion of the ring 17 to either an indicator means or means for signaling the impact tool to come to a halt.

It will be noted that the cross sections of the ball seats 24 and the grooves 23 are not simply a semicircular cross section. Instead, these cross sections are shaped like a Gothic arch. Hence, each ball seat 24 has a cross section composed of a pair of arcuate sidewalls 33 intersecting at an apex 34.

Each of the sidewalls 33 engage the ball 25 at substantially a single point. In the case of each groove 23, its cross section is composed of a pair of arcuate sidewalls 35 meeting at an apex 36 in substantially the same manner as the cross section of the ball seat 24. Each of the sidewalls 35 are limited to substantially point contact engagement with the key ball 25. Providing the grooves 23 and the ball seats 24 with a Gothic arch cross section allows these cavities to receive the ball 25 with very little clearance between the ball and its groove 23 or ball seat 24 while allowing the ball 25 to roll relatively freely in the ball groove 23 and the ball seat 24. This expedient minimizes any slop or lost motion of the ball 25 in its groove 23 and seat 24. Slop or lost motion of the ball 25 in its cavities is undesirable because it may create an inaccurate measurement of torque. In other words, slop of the balls 25 may allow the ring 17 to jump, tilt or move radially which may cause inaccuracies in the torque measurement.

The upper portion of the ring section 18 contains an annular border rib 38 which engages the lower side of the Belleville spring 27. The top of the rib 38 is arcuate shaped in cross section. This arrangement limits the engagement between the ring 17 and the spring 27 to a substantially fixed radial distance from the axis of the spindle 12 throughout the operation of the torque measuring means. In addition, the surface 39 of the thrust bearing 29 engaging the Belleville spring 27 is angled or canted from a radial plane, as shown in FIG. 2. This arrangement also limits the engagement between the thrust bearing 29 and the Belleville spring 27 to an annular line of contact which remains at a relatively fixed radial distance from the axis of the spindle 12 throughout substantially the entire operation of the torque measuring means. The canted surface 39 also allows the Belleville spring 27 to tilt through a radial plane during the operation of the torque measuring means, as shown in dotted lines in FIG. 2.

FIG. 4 illustrates a deflection characteristic of a Belleville spring of the type desired for use in the subject torque measuring means. In FIG. 4, the horizontal axis indicates the deflection or strain of the spring while the vertical axis indicates the load or stress on the spring. Looking at FIG. 4, the deflection of the Belleville spring 27 is substantially linear up to a point indicated by the reference number 41. Thereafter the deflection of spring 27 increases at a much greater rate, in proportion to the spring load, to a point indicated by 42. As a result, the curve has a substantially horizontal or nearly horizontal leg 43 located between the points 41 and 42. Along the horizontal leg 43, the spring 27 deflects at a very rapid rate with the application of relatively little additional load.

It is desirable that the spring 27 be arranged so that the horizontal leg 43, in its characteristic curve, is in the torque range which corresponds to the maximum torque loads desired to be applied to a fastener by the impact wrench 1. This is the "cut-off" torque range for the wrench 1. It is desirable that the spring 27 have the horizontal leg 43 occur at the cut-off torque so that the increased spring deflection taking place at this torque is more effective in rapidly and accurately operating a signal means at the proper moment.

*Motor cut-off means*

Means is shown in FIG. 1 for utilizing the axial movement of the ring 17 to automatically stop the impact wrench 1. This means is described below.

The trigger 5 controls the feeding of fluid pressure to an inlet port 45 opening into a chamber 46 containing a shut-off valve means 47 which is normally open and is operative to shut off the flow of pressure fluid to the tool motor 7. The chamber 46 is divided into an inlet space 48, a cylinder 49 and an outlet port 50 extending to the motor 7. The valve means 47 includes a valve seat 51 located between the inlet space 48 and the cylinder 49. As a result of this arrangement, pressure flows through the inlet port 45, the inlet 48, the valve seat 51, the cylinder 49, and the outlet port 50 to the motor 7.

A spool valve 53 is slidably mounted in the cylinder 49. The valve 53 includes a valve head portion 54 adapted to seat over the valve seat 51 to close off the inlet space 48 from the cylinder 49. A spring 55 is mounted in the cylinder 49 to bias the valve 53 to a normally open position, as shown in FIG. 1. The lower end of the spring 55 seats against a ball 56 which closes an exhaust port 57 leading to the atmosphere. The portion of the cylinder 49 containing the spring 55 and ball 56 is termed a pilot chamber 58.

The valve 53 contains a small leak passage 59 extending between the inlet space 48 and the pilot chamber 58 containing the ball 56. As a result of the leak passage 59, fluid pressure applied to the inlet space 48 will slowly flow into the pilot chamber 58 formed in the cylinder 49 at the lower end of the valve 53. After fluid pressure is applied to the inlet space 48, the sudden exhausting of the pilot chamber 58 will result in the creation of a differential fluid pressure acting across the valve 53 causing the valve 53 to be quickly closed against the spring 55.

The casing 2 contains a bore 60 encircling a slidably mounted push rod 61 arranged with its upper end adapted to move axially to engage and unseat the ball 56 to exhaust the pilot chamber 58. The lower end of the rod 61 carries an arm 62 having a finger 63 extending into an annular groove 64 provided in the circumference of the torque measuring ring 17. As a result of this arrangement, the axial upward movement of the torque measuring ring 17 will cause the lower side of the groove 64 to engage the finger 63 and move the push rod 61 upwardly, thus unseating the ball 56. As previously explained, unseating the ball 56 will cause the valve 53 to rapidly close and shut off fluid pressure to the wrench motor 7, consequently causing it to stop.

Means is provided for placing an adjustable preload on the push rod 61 urging it upwardly against the ball 56 to reduce the force which must be contributed by the torque measuring ring 17 to unseat the vent ball 56. This preload force must be less than the load applied by the spring 55 urging the ball 56 closed. The arm 62 is threaded on the push rod 61 and a spring 65 is interposed between the arm 62 and a fixed flange 66 attached to the casing 2. The lower end of the push rod 61 has an adjustment knob 67 located below the flange 66. Turning the knob 67 will vary the load on the spring 65 and adjust the spacing of the finger 63 in the groove 64. Adjusting this spacing will determine the stroke or the amount of axial movement of the ring 17 needed to move the push rod 61 and unseat the vent ball 56. Consequently, this adjustment controls the torque at which shut-off occurs. Adjustment is made to suit the application.

*Second embodiment—FIG. 5*

FIG. 5 shows a second arrangement for mounting the push rod 61 in the impact tool 1. The pilot chamber 58 is lengthened toward the front of the impact tool so that the push rod 61a is considerably shorter. The bore 60a in the casing 2 containing the push rod 61a is provided with a shoulder 68 which faces forward. A collar 69 is formed on the push rod 61a. A spring 65a encircles the push rod 61a and abuts both the shoulder 68 and the collar 69 to bias the push rod 61a forwardly. A flange 66a is located at the forward end of the push rod bore 60a to engage the collar 69 and limit the forward movement of the push rod 61a. This arrangement allows the rear end of the push rod 61a to be spaced from the pilot valve ball 56 in the pilot chamber 58.

The forward end of the push rod 61a is threaded in the arm 62 in the same manner as in the first embodiment so that turning the knob 67 can adjust and vary the spacing of the arm finger 63 in the annular groove 64 of the torque measuring ring 17. This adjustment varies the distance between the forward face of the finger 63 and the rear wall of the groove 64 when the impact tool is at rest. This distance is called the "stroke" of the torque measuring ring 17 because this ring must move axially this distance before it engages the finger 63 and begins to move the push rod 61a rearwardly. As in the first embodiment, the "stroke" adjustment is made to vary the shut-off torque to suit the application.

*Third embodiment—FIG. 6*

This embodiment utilizes the torque measuring device 16 to operate a signal indicator for informing the wrench operator when the maximum torque is reached. This third embodiment is identified by the reference number 70 and the various parts shown in FIG. 6 which are similar to parts shown and described in the first embodiment bear identical reference numbers.

The torque measuring device 16 shown in FIG. 6 is the same as in the first embodiment with the exception that it is mounted in a reversed position on the spindle 12. Due to the reversed mounting of the device 16, the ring 17 will move axially downward or forward to indicate and measure the torque load applied to a fastener being tightened by the wrench 70.

A signal indicator 71 is mounted on the nose 3 of the casing 2 for actuation by the torque measuring device 16. The indicator 71 includes a body 72 fastened to the casing 2 by bolts 73. The body 72 contains a slidably mounted indicator rod 74 slidable between a position fully housed in the body 72, as shown in FIG. 6, and an indicating position projecting upwardly from the body 72 as shown in dotted lines in FIG. 6. The upper end 75 of the rod 74 can be painted a distinctive color to make it more readily observed when in an indicating position.

The rod 74 carries an annular collar 76 housed in an enlarged bore 77 which allows the rod 74 to travel over a limited distance before the collar 76 engages the ends of the bore 77. A spring 78 is interposed between the collar 76 and the lower end of the bore 77 to urge the rod 74 upwardly to an indicating position.

The rod 74 is held in its housed or nonindicating position by a latch means including a bell-crank 79 pivoted in a cavity in the lower end of the body 72. The bell-crank 79 includes a tang 80 adapted to fit in a notch provided in the lower end of the rod 74 to latch it in the housed position. The bell-crank 79 further has an arm 81 extending into the annular groove 64 provided in the torque measuring ring 17 whereby the torque measuring ring 17 can pivot the bell-crank 79 to a position releasing the indicator rod 74. A spring 82 is disposed between the arm 81 and the body 72 for urging the bell-crank 79 toward a latching position with the indicator rod 74.

It should now be obvious that as the wrench 70 tightens a fastener and the torque load rises, the torque measuring ring 17 will ultimately move forward on the spindle 12, when the torque load reaches the shut-off torque. This forward movement of the ring 17 will swing the bell-crank 79 to an unlatching position releasing the indicator rod 74. Thereafter, the top 75 of the rod 74 will project from the body 72 to signal the operator to stop the wrench 70. The operator will manually force the rod 74 back downwardly to a latched position with the bell-crank 79 prior to the start of another fastener tightening operation.

While several embodiments of the invention are shown and described in detail, this invention is not limited simply to the specifically described embodiments, but contemplates other embodiments and variations which utilize the concepts and teachings of this invention. For example, it will now be apparent that the torque measuring ring 17 could be arranged to actuate an electrical signal, such as the ringing of a bell or the lighting of a lamp.

Having described our invention, we claim:

1. A rotary impact tool comprising:
    motor means;
    a hammer driven by said motor means;
    an anvil arranged to be periodically impacted by said hammer and adapted to be connected to a fastener driving socket or bit;
    a torque measuring ring mounted on said anvil for limited rotation relative to it and arranged to sense deceleration forces acting on said anvil;
    cam means interconnected between said ring and said anvil for forcing said ring to move axially on said anvil as it rotates relative to it; and
    a spring mounted on said anvil and biasing said ring in a rotary direction which is counter to the normal rotating direction of said anvil caused by the delivering of impacts to the anvil from said hammer whereby the rotation of said ring on said anvil will be a measure of the deceleration forces acting on said anvil, said spring being of the type which applies a force to said ring acting along the axis of said anvil.
2. The impact tool of claim 1 wherein:
    said spring has a ring-like shape and engages one end of said ring.
3. The impact tool of claim 2 wherein:

said spring engages said ring at a point which remains at a fixed radial distance from the axis of said ring throughout the operational movement of said ring.

4. The impact tool of claim 2 wherein:
said spring is substantially a Belleville spring.

5. The impact tool of claim 4 wherein:
said spring deflects in a nonlinear manner with substantially increased deflection occurring at higher loads.

6. The impact tool of claim 5 including:
switch means for shutting off said motor and an interconnection between said ring and said switch for actuating said switch to shut off the motor at a predetermined point in the path of axial movement of said ring.

7. The impact tool of claim 6 wherein:
said spring includes means for adjusting the axial load on said spring.

8. The impact tool of claim 1 wherein:
said cam means includes slot means extending in both the rotary and axial directions, ball seat means and a ball interposed between and seated in both of said latter means with one of said means provided in said anvil and the other means provided in said torque measuring ring.

9. The impact tool of claim 8 wherein:
said slot means has a cross section shaped like a Gothic arch.

10. The impact tool of claim 1 wherein:
said spring is mounted on said anvil by means providing for adjustment of the load on said spring.

11. The impact tool of claim 10 wherein:
said last named means includes a nut on said anvil and a thrust bearing interposed between said nut and said spring permitting said spring to rotate said ring.

12. The impact tool of claim 11 wherein:
said thrust bearing includes a conical face engaging said spring with said face extending radially outward and axially away from said spring.

13. A rotary impact tool comprising:
a spindle adapted to be connected to a fastener for delivering a series of rotary impacts thereto;
means for applying a series of rotary impacts to said spindle;
a torque measuring ring mounted on said spindle for limited rotation relative to it;
cam means interconnected between said ring and said spindle for forcing said ring to move axially on said spindle as it rotates relative to it;
a spring mounted on said spindle for biasing said ring in a rotary direction which is counter to the normal rotating direction of said spindle caused by the delivering of said rotary impacts to said spindle, said spring being of the type which applies a force to said ring acting along the axis of said spindle; and
means for measuring the axial movement of said ring on said spindle and indicating when such axial movement of said ring reaches a predetermined distance.

14. A rotary impact tool comprising:
a spindle adapted to be connected to a fastener for delivering a series of rotary impacts thereto;
means for applying a series of rotary impacts to said spindle;
a torque measuring ring mounted on said spindle for limited rotation relative to it;
rolling cam means interconnected between said ring and said spindle for forcing said ring to move axially on said spindle as it rotates relative to it, said rolling cam means having means which substantially eliminates all free motion or slop of said ring on said spindle;
a spring mounted on said spindle for biasing said ring in a rotary direction which is counter to the normal rotating direction of said spindle caused by the delivering of said rotary impacts to said spindle; and
means for measuring the axial movement of said ring on said spindle and indicating when such axial movement of said ring reaches a predetermined distance.

15. The impact tool of claim 14 wherein:
said rolling cam means includes slot means extending in both the rotary and axial directions, ball seat means and a ball interposed between and seated in both of said latter means with one of said means provided in said spindle and the other means provided in said torque measuring ring.

16. The impact tool of claim 15 wherein:
said slot means has a cross section shaped like a Gothic arch.

References Cited
UNITED STATES PATENTS

| 2,808,916 | 10/1957 | Johnson | 173—12 |
| 2,889,902 | 6/1959 | Harrison et al. | 192—.02 |
| 3,131,554 | 5/1964 | Hornschuch | 173—93 |
| 3,162,250 | 12/1964 | Sindelar | 173—12 |
| 3,174,559 | 3/1965 | Vaughn | 173—12 |
| 3,195,702 | 7/1965 | Alexander | 173—12 |

ERNEST R. PURSER, Primary Examiner.

FRED C. MATTERN, Examiner.

L. P. KESSLER, Assistant Examiner.